(12) United States Patent
Cauquy et al.

(10) Patent No.: US 7,952,690 B2
(45) Date of Patent: May 31, 2011

(54) METHOD AND SYSTEM FOR ACQUIRING A 3-D IMAGE OF A SCENE

(75) Inventors: Marie-Astrid Cauquy, Guénange (FR);
Laurent Lamesch, Lamadelaine (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 44 days.

(21) Appl. No.: 12/441,827

(22) PCT Filed: Sep. 11, 2007

(86) PCT No.: PCT/EP2007/059507
§ 371 (c)(1),
(2), (4) Date: Jun. 23, 2009

(87) PCT Pub. No.: WO2008/034738
PCT Pub. Date: Mar. 27, 2008

(65) Prior Publication Data
US 2010/0045966 A1 Feb. 25, 2010

(30) Foreign Application Priority Data
Sep. 20, 2006 (EP) .................................. 06120996

(51) Int. Cl.
*G01C 3/08* (2006.01)
(52) U.S. Cl. ........................... 356/5.1; 356/5.15
(58) Field of Classification Search ........... 356/4.01, 356/5.01, 5.1, 5.11, 5.15
See application file for complete search history.

(56) References Cited

U.S. PATENT DOCUMENTS

| | | | |
|---|---|---|---|
| 3,813,165 A | 5/1974 | Hines et al. | |
| 5,877,851 A * | 3/1999 | Stann et al. | 356/5.09 |
| 7,609,367 B2 * | 10/2009 | Watgen et al. | 356/5.1 |

FOREIGN PATENT DOCUMENTS

| | | |
|---|---|---|
| DE | 3219452 | 3/1983 |
| DE | 4439298 | 6/1996 |
| WO | 9810255 | 3/1998 |
| WO | 2006097406 | 9/2006 |

OTHER PUBLICATIONS

International Search Report PCT/EP 2007/059507; Dated Feb. 13, 2008.

* cited by examiner

*Primary Examiner* — Isam Alsomiri
(74) *Attorney, Agent, or Firm* — Cantor Colburn LLP

(57) ABSTRACT

For acquiring a 3-D image of a scene, the scene is illuminated with modulated light emitted by an illumination unit and imaged onto an array of lock-in pixel sensor cells, which detect the previously emitted light after it has been scattered or reflected by an object or a living being in the scene. One determines the modulation phase of the light detected at the lock-in pixel sensor cells and provides a reference modulation phase that stands in a known relationship with the modulation phase of the light at the time of the emission. Based upon the reference modulation phase and the modulation phase of the light detected at the lock-in pixel sensor cells one then calculates depth information on the scene. The modulated light is emitted by a plurality of individual light emitting devices of the illumination unit, each of the light emitting devices emitting a part of the modulated light, and the reference modulation phase is provided as an average of the modulation phases of the parts of modulated light emitted by the light emitting devices.

12 Claims, 2 Drawing Sheets

METHOD AND SYSTEM FOR ACQUIRING A 3-D IMAGE OF A SCENE

TECHNICAL FIELD OF THE INVENTION

The present invention relates to a 3-D (three-dimensional) imaging system.

BACKGROUND OF THE INVENTION

Systems for creating a 3-D representation of a given portion of space have a variety of potential applications in many different fields. Examples are automotive sensor technology (e.g. vehicle occupant detection and classification), robotic sensor technology (e.g. object identification) or safety engineering (e.g. plant monitoring) to name only a few. As opposed to conventional 2-D imaging, a 3-D imaging system requires depth information about the target scene. In other words, the distances between one or more observed objects and an optical receiver of the system need to be determined. A well-known approach for distance measurement, which is used e.g. in radar applications, consists in timing the interval between emission and echo-return of a measurement signal. This so called time-of-flight (TOF) approach is based on the principle that, for a signal with known propagation speed in a given medium, the distance to be measured is given by the product of the propagation speed and the time the signal spends to travel back and forth.

In case of optical imaging systems, the measurement signal consists of light waves. For the purposes of the present description, the term "light" is to be understood as including visible, infrared (IR) and ultraviolet (UV) light.

Distance measurement by means of light waves generally requires varying the intensity of the emitted light in time. The TOF method can e.g. be using the phase-shift technique or the pulse technique. In the phase-shift technique, the amplitude of the emitted light is periodically modulated (e.g. by sinusoidal modulation) and the phase of the modulation at emission is compared to the phase of the modulation at reception. In the pulse technique, light is emitted in discrete pulses without the requirement of periodicity. In phase-shift measurements, the modulation period is normally in the order of twice the difference between the maximum measurement distance and the minimum measurement distance divided by the velocity of light. In this approach, the propagation time interval is determined as phase difference by means of a phase comparison between the emitted and the received light signal. Such phase comparison requires synchronization of the demodulation signal with the emitted light signal. Due to the high propagation speed given by the velocity of light, a fundamental difficulty encountered in distance measurements based on the pulse technique or the phase-shift technique resides in the required temporal resolution of the measurement device. In fact, a spatial resolution in the order of centimeters requires a temporal resolution in the order of $10^{-11}$ seconds (10 ps).

With both the pulsed light and phase shift methods, time intervals are generally measured in the electrical domain. Therefore, electric propagation times and delays which affect the synchronization in the measurement device have a determining influence on the measurement accuracy. Current problems in this respect are unknown variations and drifts of the electric propagation times on the signal lines and of the delays in the electronic components. For instance, there may be variations between devices of the same type occur, for example because of tolerances in the production processes (e.g. semiconductor production). Additionally, drifts may occur during operation, e.g. due to temperature variations or component ageing. These variations and drifts have a detrimental influence on measurement accuracy.

As a result, efforts have been made to overcome this problem by providing a more reliable synchronization. It has been proposed, for example by Schwarte in WO98/10255, to provide an optical feedback path from the light emitting module to one or more sensor cells of the light receiving camera. As shown in DE 44 39 298 by Schwarte, a phase reference for synchronization purposes can be obtained by guiding the emitted light without reflection to the receiver e.g. through an optical fibre.

An improved 3-D imaging system has been proposed in the international patent application PCT/EP2006/060374. This patent application discloses a 3-D imaging system comprising an illumination unit for emitting light into a scene and an imaging sensor for imaging the scene by detecting scattered light. The system also comprises an evaluation unit, for determining distance information related to the scene on the basis of light propagation time, and synchronization means for providing synchronization information to the evaluation unit. To overcome the above-mentioned drawbacks, the synchronization means comprises means for generating an electrical reference signal in the illumination unit, the reference signal being directly derived from the emitted light.

BRIEF DESCRIPTION OF THE INVENTION

The present invention to provides an improved method for acquiring a 3-D image of a scene.

For acquiring a 3-D image of a scene, the scene is illuminated with modulated light emitted by an illumination unit and imaged onto an array of lock-in pixel sensor cells, which detect the previously emitted light after it has been scattered or reflected by an object or a living being in the scene. One determines the modulation phase of the light detected at the lock-in pixel sensor cells. We herein use the term modulation phase to designate the phase of the modulation and avoid confusion with the phase of the electromagnetic waves forming the light. By determining the difference of the modulation phase at the time of the emission of the light at the illumination unit and at the time of the reception at the lock-in pixel sensor cells, one can immediately determine the distance the light has travelled. More generally, one provides a reference modulation phase that stands in a known relationship with the modulation phase of the light at the time of the emission. Based upon the reference modulation phase and the modulation phase of the light detected at the lock-in pixel sensor cells one then calculates depth information on the scene. According to an important aspect of the invention, the modulated light is emitted by a plurality of individual light emitting devices of the illumination unit, each of the light emitting devices emitting a part of the modulated light, and the reference modulation phase is provided as an average of the modulation phases of the parts of modulated light emitted by the light emitting devices. As mentioned above, there may be variations in the delay between the driving signal driving the light emitting devices and the emitted optical power. For some applications, e.g. passenger detection or classification for a vehicle seat, an accuracy of the 3-D imaging system in the cm range is required. This implies that the required accuracy in the delay would have to be about 30 ps (out of 10 ns). If only one light emitting device were used as a source for the reference modulation phase, this accuracy would thus imply extremely severe requirements with regard to production tolerances, component ageing and temperature drifts. In the present invention, one therefore proposes to use a plurality of light emitting devices and to provide the reference modulation phase as an average of the modulation phases of the light emitted by the different light emitting devices. The production requirements for the individual light emitting devices may thus be somewhat relaxed.

According to a first embodiment of the invention, one provides the reference modulation phase by gathering modulated light from the individual light emitting devices in the illumination unit. The modulation phase of the gathered modulated light as a whole is then detected and used as reference modulation phase.

According to another embodiment of the invention, one detects the modulation phases of the parts of modulated light emitted by the light emitting devices individually; one then calculates an average of these modulation phases and uses it as reference modulation phase.

The average of the modulation phases of the parts of modulated light emitted by the light emitting devices preferably takes into account how much each light emitting device contributes to the illumination of the scene. If the individual light emitting devices contribute approximately equally to illuminating the scene, the modulation phases of the different parts of modulated light preferably contribute approximately equally to the average. If the individual light emitting devices contribute by different extents to illuminating the scene, the modulation phases of the different parts of modulated light preferably contribute by corresponding extents to the average.

The invention also concerns a 3-D imaging system configured for implementing the method described above. Such a 3-D imaging system preferably comprises an illumination unit with a plurality of individual light emitting devices for emitting modulated light into the scene, at least one reference light sensor for detecting a reference modulation phase of light emitted at the illumination unit and a camera, e.g. a CMOS or CCD camera. The camera includes an array of lock-in pixel sensor cells and an optical arrangement for imaging the scene onto the array of lock-in pixel sensor cells and determines, in operation, the modulation phase of light detected at the lock-in pixel sensor cells. The imaging system further comprises an evaluation unit operationally connected to the at least one reference light sensor and the lock-in pixel sensor cell array for calculating depth information on the scene based upon the reference modulation phase and the modulation phase of the light detected at the lock-in pixel sensor cells. During operation, each individual light emitting device emits a part of the modulated light and the reference light sensor provides the reference modulation phase as an average of the modulation phases of the parts of modulated light emitted by the light emitting devices.

According to a first embodiment of the 3-D imaging system, the reference light sensor is arranged in the illumination unit in vicinity of the individual light emitting devices so as to be able to gather light from the individual light emitting devices. Alternatively, the system may comprise a light guide arranged for gathering light from the individual light emitting devices and guiding the gathered light from the individual light emitting devices to the reference light sensor. Such a light guide may, for instance, comprise an optical fibre. Preferably, however, the light guide comprises a substantially transparent plate portion (e.g. made of a thermoplastic material) arranged in front of the light emitting devices and a tubular light pipe portion connected to the plate portion and preferably made of the same material as the plate portion and formed as a single piece together therewith. A small amount of the light emitted by the light emitting devices thus is withheld by the plate portion and through internal reflection gets to the light pipe portion of the light guide, which then guides it to the reference light sensor. As yet another alternative, the 3-D imaging system may comprise a plurality of light guides arranged each for guiding light from an individual light emitting device to the reference light sensor. In consequence, the reference modulation phase is derived from the gathered light as a whole, which intrinsically provides the averaging.

The reference light sensor might e.g. comprise a photodiode, but preferably, it comprises one or more lock-in pixel sensor cells. These may be part of the camera, which implies that the same hardware is used for retrieving the reference modulation phase and the scene information. This is, of course, considered as particularly advantageous since the pixels used as reference light sensor thus are subject to the same ageing and temperature effects (thermal noise) as the pixels used for detecting light from the scene. The result of the method is thus expected to be even more accurate in this particular embodiment.

According to another embodiment of the system, there is a plurality of individual lock-in pixel sensor cells and a plurality of individual light guides, each individual light guide being arranged for guiding light from an individual light emitting device to an individual lock-in pixel sensor cell of the reference light sensor. In this case, the evaluation unit may be configured for calculating the reference modulation phase as an average of modulation phases of light detected at the individual lock-in pixel sensor cells of the reference light sensor.

BRIEF DESCRIPTION OF THE FIGURES

Further details and advantages of the present invention will be apparent from the following detailed description of several not limiting embodiments with reference to the attached drawings, wherein.

DETAILED DESCRIPTION OF THE INVENTION

Figure 1:
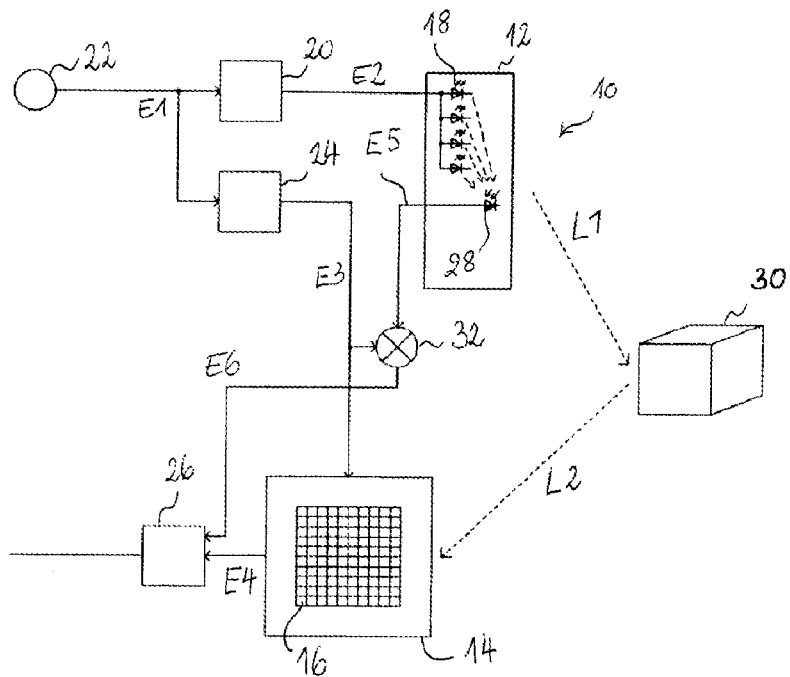
FIG. 1 is schematic diagram of a first embodiment of a 3-D imaging system.

FIG. 1 shows a first embodiment of a 3-D imaging system, generally identified by reference numeral 10. The 3-D imaging system 10 comprises an illumination unit 12 emitting light onto a scene, and an imaging sensor 14 imaging the scene. The imaging sensor 14 comprises, in a manner known per se, the required optical accessories such as a focusing lens (not shown) and an electronic camera chip executed in any suitable technology, such as CCD, CMOS and/or TFA. Accordingly, the imaging sensor 14 comprises a two-dimensional array of individual lock-in pixel sensor cells 16 (each of which receives light from a small portion of a target scene) for creating a pixel-by-pixel image thereof.

The illumination unit 12 comprises several individual light emitting devices 18 such as light emitting diodes (LEDs), which are collectively driven by means of an illumination driver 20. A signal source 22 provides the input signals for the illumination driver 20 and a photo gate driver 24. The output of the photo gate driver 24 is connected to the imaging sensor 14. An evaluation unit 26 comprising a suitable electronic calculation device, e.g. a digital signal processor (DSP), is connected to the output of the imaging sensor 14.

In operation the signal source 22 generates a modulation signal E1 on its output and feeds this modulation signal E1 to the illumination driver 20. The latter drives the illumination unit 12 with a drive signal E2 to emit a temporally modulated light signal L1 onto a target scene comprising an object 30 (for illustration purposes). Examples for temporal modulation of the light signal L1 are a sinusoidal amplitude modulation or a periodically pulsed emission scheme. The modulated light signal L1 is reflected or scattered by the object 30 so as to form a returning light signal L2 which is received as incident light by the imaging sensor 14. The modulation signal E1 is also fed to the photo gate driver 24 which transforms the modulation signal E1 into a demodulation signal E3. The imaging sensor 14 receives this demodulation signal E3. By means of this demodulation signal E3 and the detected light signal L2, the imaging sensor 14 produces a phase information signal E4 which is fed to the evaluation unit 26 for extraction of the distance information concerning the object 30.

The 3-D imaging system 10 comprises a photodiode 28 mounted in the illumination unit 12 contiguous to the light emitting devices 18 in such a way that it gathers light from all the light emitting devices 18. The photodiode 28 derives an output signal E5 from the emitted light by photoelectric conversion. The electrical output signal E5 thus corresponds to an average of the optical signals received by the photodiode 28 from the individual light emitting devices. A mixer element 32 receives the output signal E5 of the photodiode 28 and the demodulation signal E3 at its input and provides a reference modulation phase signal E6 at its output. The mixer element 32 is designed to imitate, together with the photodiode 28, the function of a sensor cell 16 of the imaging sensor 14.

Figure 2:
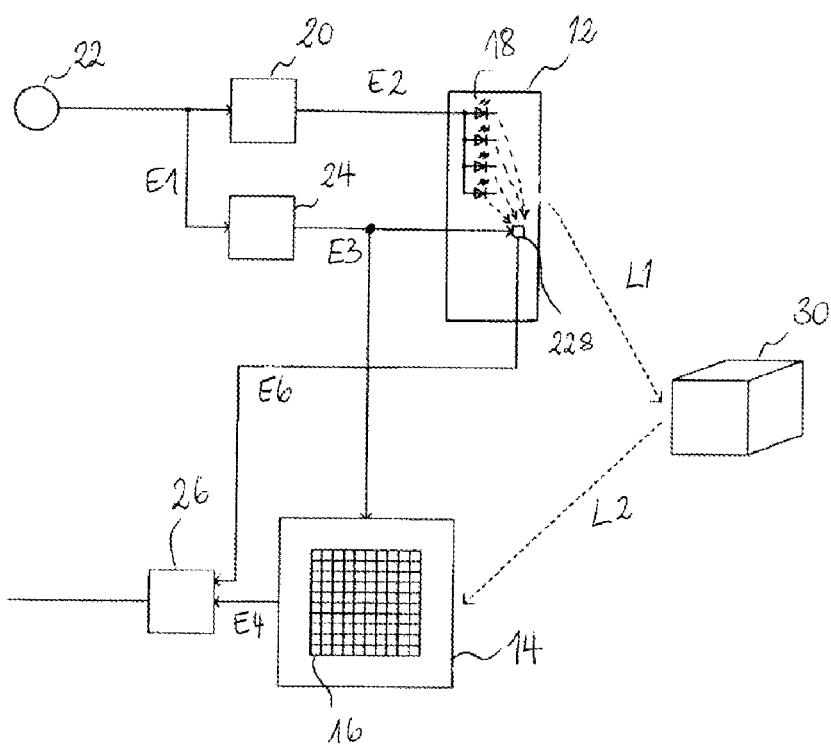
FIG. 2 is schematic diagram of a second embodiment of a 3-D imaging system.

FIG. 2 shows another embodiment of a 3-D imaging system 10. In the following, only the differences to the previously discussed embodiment are going to be discussed. In the 3-D imaging system of FIG. 2, a single independent sensor cell 228 is placed in the illumination unit 12 in close proximity to its light emitting devices 18, in such a way that it gathers light from all the light emitting devices 18. The sensor cell 228 is of essentially the same construction as the sensor cells 16 of the imaging sensor 14. As the sensor cells 16, the sensor cell 228 is fed with the demodulation signal E3. As opposed to the imaging system of FIG. 1, the instant 3-D imaging system does not require a mixer element since the sensor cell 228 directly provides an averaged electrical reference signal with the function of the synchronization signal E6. As will be appreciated, the independent sensor cell 228 placed inside the illumination unit 12 provides a modulation phase reference essentially corresponding to a "zero" distance measurement. The evaluation unit 26 determines distance information on the basis of the synchronization signal E6 from the sensor cell 228 and the modulation phase information signal E4 from the imaging sensor 14.

Figure 3:
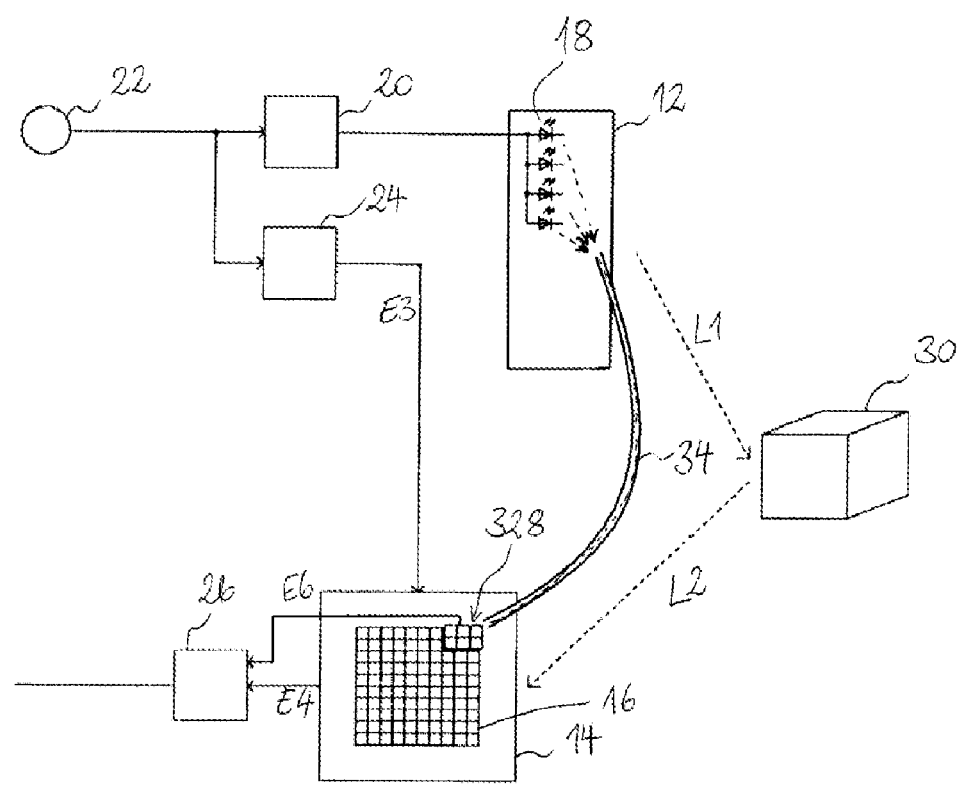
FIG. 3 is schematic diagram of a third embodiment of a 3-D imaging system.

FIG. 3 shows yet another embodiment of a 3-D imaging system 10. In the 3-D imaging system of FIG. 3, one uses a light guide 34, e.g. an optical fibre, mirror and/or prism optics, to guide light from all the light emitting devices 18 to a dedicated area 328 of the two-dimensional array of individual lock-in pixel sensor cells 16. The lock-in pixel sensor cells of area 328 thus provide the averaged reference modulation phase signal E6. As will be appreciated, the sensor cells of area 328 provide a modulation phase reference that essentially corresponds to the length of the light path in light guide 34. The evaluation unit 26 determines distance information on the basis of the synchronization signal E6 from the sensor cells of area 328 and the modulation phase information signal E4 from the imaging sensor 14.

The invention claimed is:

1. A method of acquiring a 3-D image of a scene, comprising:
    illuminating said scene with modulated light emitted at an illumination unit;
    imaging said scene onto an array of lock-in pixel sensor cells and detecting at said lock-in pixel sensor cells light scattered in said scene;
    determining a modulation phase of the light detected at said lock-in pixel sensor cells;
    providing a reference modulation phase;
    calculating depth information on said scene based upon said reference modulation phase and said modulation phase of the light detected at said lock-in pixel sensor cells;
    wherein said modulated light is emitted by a plurality of individual light emitting devices of said illumination unit, each of said light emitting devices emitting a part of said modulated light, and wherein said reference modulation phase is provided as an average of the modulation phases of the parts of modulated light emitted by said light emitting devices.

2. The method according to claim 1, wherein providing said reference modulation phase comprises gathering, at said illumination unit, modulated light from said light emitting devices, detecting a modulation phase of the gathered modulated light and using the modulation phase of the gathered modulated light as reference modulation phase.

3. The method according to claim 1, wherein providing said reference modulation phase comprises individually detecting the modulation phases of the parts of modulated light emitted by said light emitting devices, calculating an average of the modulation phases of the parts of modulated light and using said calculated average as reference modulation phase.

4. The method according to claim 1, wherein the individual light emitting devices contribute approximately equally to illuminating said scene and wherein the modulation phases of the different parts of modulated light contribute approximately equally to said average.

5. The method according to claim 1, wherein the individual light emitting devices contribute by different extents to illuminating said scene and wherein the modulation phases of the different parts of modulated light contribute by corresponding extents to said average.

6. A 3-D imaging system for acquiring a 3-D image of a scene comprising
    an illumination unit to emit modulated light into said scene;
    at least one reference light sensor to detect a reference modulation phase;
    a camera including an array of lock-in pixel sensor cells and an optical arrangement to image said scene onto said array of lock-in pixel sensor cells, said camera being configured and arranged to determine a modulation phase of light detected at said lock-in pixel sensor cells;
    an evaluation unit operationally connected to said at least one reference light sensor and said lock-in pixel sensor cell array to calculate depth information on said scene based upon said reference modulation phase and said modulation phase of the light detected at said lock-in pixel sensor cells;
    wherein said illumination unit comprises a plurality of individual light emitting devices, each of said light emitting devices being configured to emit a part of said modulated light, and wherein said reference light sensor is configured and arranged to provide said reference modulation phase as an average of the modulation phases of the parts of modulated light emitted by said light emitting devices.

7. The 3-D imaging system according to claim 6, wherein said reference light sensor is arranged in said illumination unit in vicinity of said individual light emitting devices so as to be able to gather light from said individual light emitting devices.

8. The 3-D imaging system according to claim 6, comprising a light guide arranged to gather light from said individual light emitting devices and guide the gathered light from said individual light emitting devices to said reference light sensor.

9. The 3-D imaging system according to claim 6, comprising a plurality of light guides arranged each to guide light from an individual light emitting device to said reference light sensor.

10. The 3-D imaging system according to claim 6, wherein said reference light sensor comprises a lock-in pixel sensor cell.

11. The 3-D imaging system according to claim 10, wherein said reference light sensor comprises one or more lock-in pixel sensor cells of said camera.

12. The 3-D imaging system according to claim 6, wherein said reference light sensor comprises a plurality of individual lock-in pixel sensor cells, wherein said 3-D imaging system comprises a plurality of individual light guides, each individual light guide being arranged to guide light from an individual light emitting device to an individual lock-in pixel sensor cell of said reference light sensor, and wherein said evaluation unit is configured to calculate said reference modulation phase as an average of modulation phases of light detected at said individual lock-in pixel sensor cells of said reference light sensor.

* * * * *